Oct. 24, 1950 P. C. LITTLE ET AL 2,527,434
CHILD'S VEHICLE
Filed Aug. 27, 1948 2 Sheets-Sheet 1
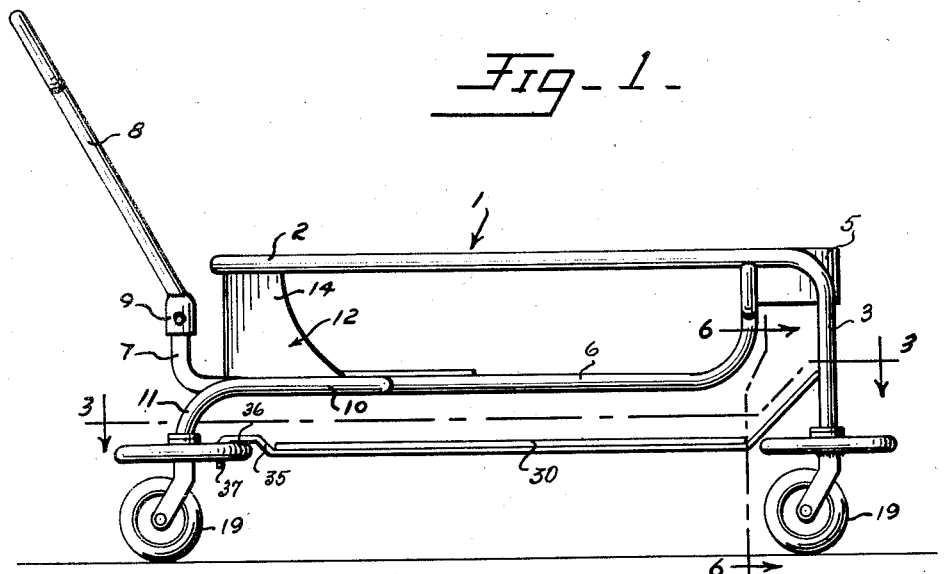
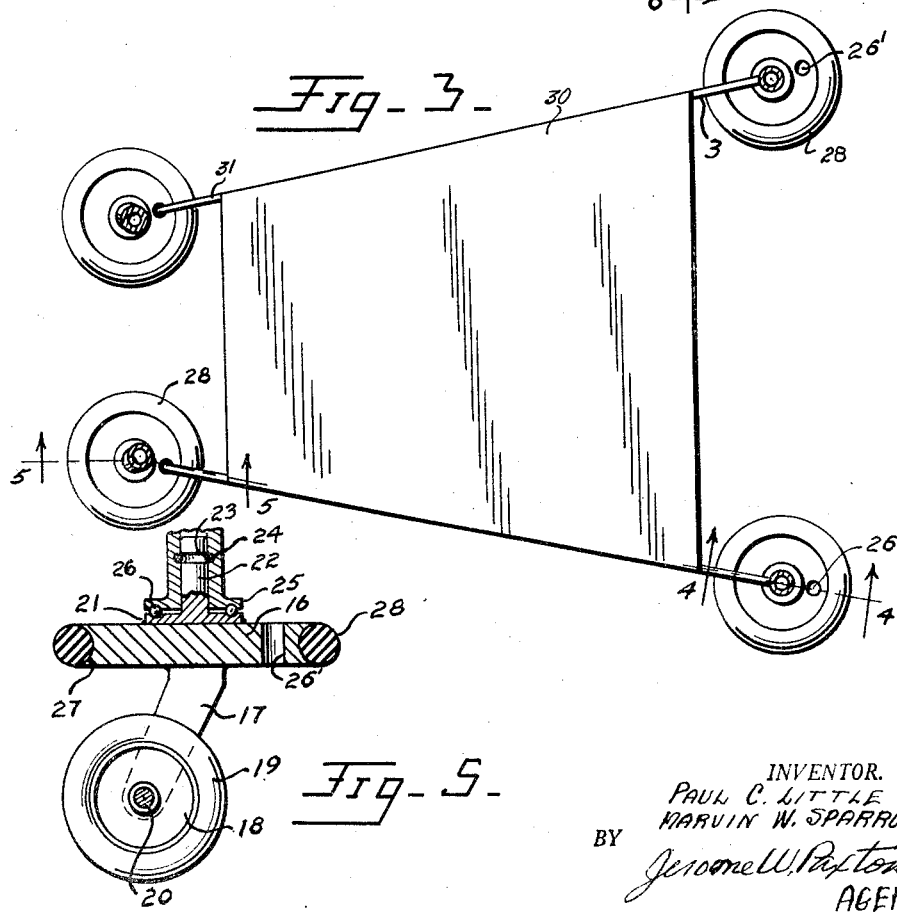
INVENTOR.
PAUL C. LITTLE
MARVIN W. SPARROW
BY Jerome W. Paxton
AGENT.

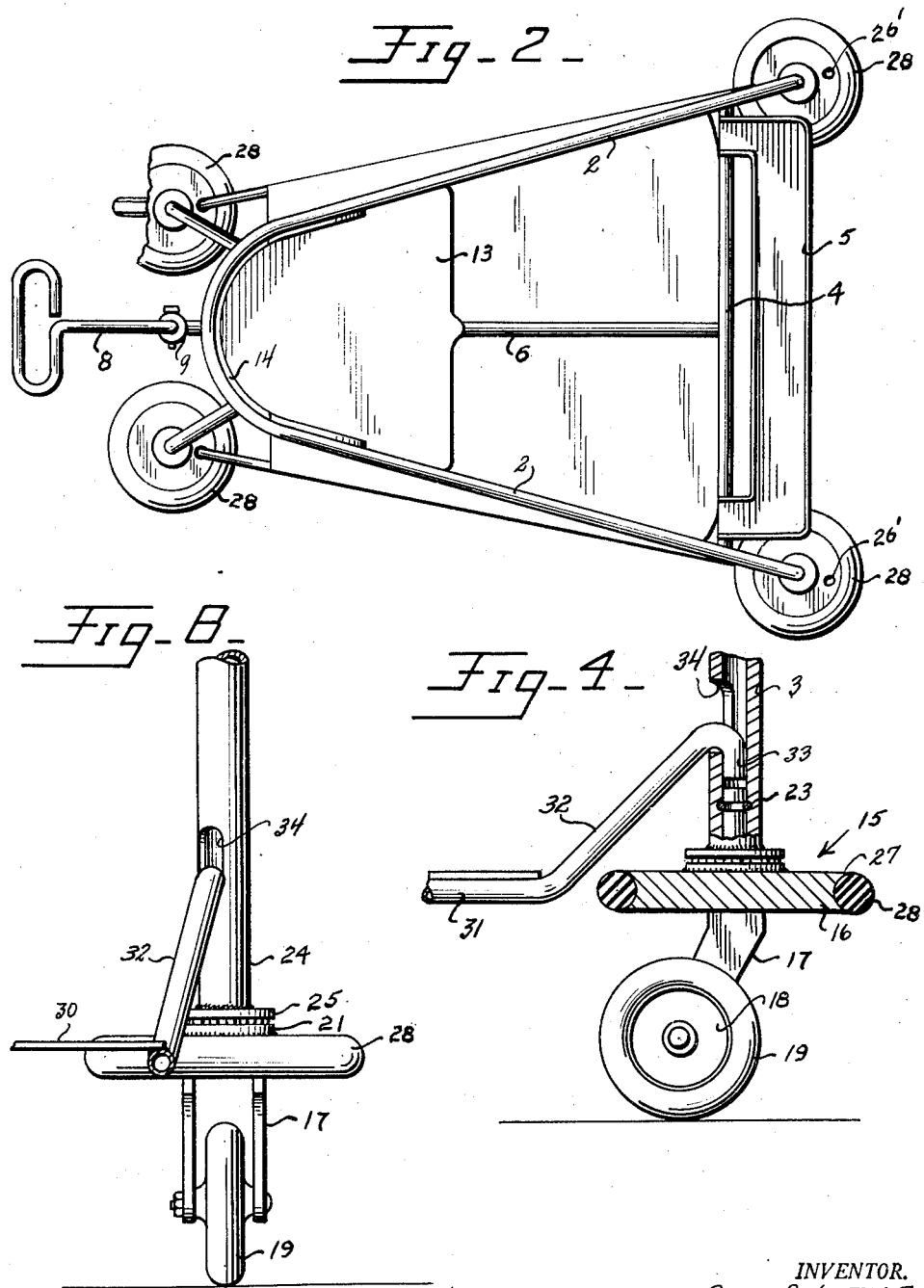

Patented Oct. 24, 1950

2,527,434

UNITED STATES PATENT OFFICE 2,527,434

CHILD'S VEHICLE

Paul C. Little, Hoboken, N. J., and Marvin W. Sparrow, Brooklyn, N. Y.

Application August 27, 1948, Serial No. 46,406

2 Claims. (Cl. 155—22)

The present invention relates to children's vehicles of the type covered in Patent No. 2,425,253, dated August 5, 1947, and more particularly has reference to a vehicle embodying certain improvements thereover.

Our improvement essentially is directed to a novel manner of mounting the wheels to the frame whereby each of the wheels may have free swivelling movement when the vehicle is employed as a walker, provision being made to hold the rear wheels in the line of travel of the vehicle when it is used as a stroller. In the latter case, complemental means on the rear wheels and on the foot support will prevent rotation of the wheels.

Accordingly, an important object of the present invention is to provide novel means for mounting the surface-engaging wheels of the vehicle to the frame thereof, whereby the wheels may have free swivelling action.

Another object of our invention is to provide a wheel of the character described wherein a resilient bumper or buffer forms a unitary part of the wheel assembly.

And yet a further object of our invention is to provide a removable foot support for a child's vehicle of the character set forth wherein one end of the foot support is detachably connected to the rear wheels of the vehicle, whereas the opposite or forward end of the support is removably connected to the supporting legs of the front wheels.

Still another object of this invention is to provide a novel free swivelling wheel which may be employed with efficacy at either the front or rear ends of the vehicle.

A further object of the present invention is to provide a child's vehicle of the so-called "stroller" type, wherein the wheel assembly supports the weight of the foot rest and of the child.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a view in side elevation of a child's vehicle constructed according to the present invention.

Figure 2 is a plan view of the vehicle shown in Figure 1.

Figure 3 is a sectional view taken along the line 3—3 of Figure 1, looking in the direction of the arrows.

Figure 4 is a vertical sectional view taken along the line 4—4 of Figure 3, looking in the direction of the arrows but being on a slightly enlarged scale.

Figure 5 is a vertical sectional view taken along the line 5—5 of Figure 3, looking in the direction of the arrows but being on a slightly enlarged scale.

Figure 6 is a view taken along the line 6—6 of Figure 1, looking in the direction of the arrows, but being on a slightly enlarged scale.

Referring to the drawings, we have designated a frame, preferably formed of tubular metal construction, such as steel, aluminum or the like, by the numeral 1, and the frame comprises an upper substantially horizontal U-shaped member 2 provided at each free end thereof with a downwardly bent portion 3, which is disposed at approximately right angles to the member 2, as shown in Figure 1. The arms of the U-shaped member 2 diverge at their free ends, and a tubular element 4 is welded at each of its extremities to the member 2 adjacent the forward ends for reinforcing purposes. A sheet metal tray 5 for holding toys and the like is conveniently attached to the tubular element and projects forwardly therefrom. A second tubular member 6 extends longitudinally of the vehicle and the forward end thereof is curved upwardly and welded or brazed to the tubular member 4 intermediate the ends thereof. The rear end of the member 6 is curved upwardly, as indicated at 7 (Figure 1) and supports a handle 8 detachably connected thereto, as shown at 9.

A pair of tubular members 10 are welded to the longitudinally extending member 6 adjacent the rear end thereof, and each tubular member 10 extends rearwardly horizontally of the frame and terminates in a downwardly curved portion 11 and, as will hereinafter be more fully apparent, the members 10 will serve to support the rear wheels of the vehicle. A metal seat 12 having a saddle portion 13 and a vertical wall 14 providing the sides and curved back is permanently secured to the longitudinal member 6 and the tubular members 10. A free swivelling wheel 15 is supported at the lower end of each of the tubular members 3 and the vertical portion 11. The wheel 15 comprises an annular metal disk 16, to the lower face of which is welded a bifurcated member 17. A caster 18 having a resilient tire 19 is journalled in the lower end of the bifurcated member 17, as shown at 20.

A ring-like member 21 provided with a vertical extension 22 is attached in any desirable manner to the upper surface of the disk 16, and the extension 22 is adapted to extend into the lower end of the leg 3 and the vertical portion 11 of the tubular member 10. If desired, the extension 22 may be provided with a circumferential groove 23 adjacent the upper end thereof, into which a spring member 24 carried by the inner wall of the leg 3 and vertical portion 11 may project to prevent any appreciable vertical movement of the wheel 15 relative to the leg 3 or vertical portion 11. As shown in Figure 5, the lower end of the tubular portion 11 is provided with a horizontal flange 25, the diameter of which is equal to the diameter of the ring-like member 21. The ring-like member 21 and the flange 25 serve as races for ball bearings 26, and hence it can be seen that the disk 16 and the wheel 18 may have free swivelling movement in the tubular portion 11 by virtue of this bearing assemblage. Since the wheel assembly 15 provided for each of the legs 3 is identical in construction to the wheel above described, it is manifest that the front wheels likewise are mounted for free swivelling movement relative to the legs 3.

It will be further noted that the disk 16 is provided with a vertical opening 26' and the purpose thereof will later be more fully described. Additionally, the outer periphery of the disk 16 is grooved, as shown at 27, for the reception of a resilient bumper or buffer 28. As is readily apparent from the drawings, the bumper 28 extends beyond all portions of the frame 1 with the sole exception of the handle 8, and hence, the bumper will prevent the vehicle from damaging furniture and the like when the stroller is in use within the home.

A sheet metal foot support 30 is provided for use with the frame 1 when the vehicle is to be employed as a stroller. As best illustrated in Figures 3 and 6, a rod or tube 31 is suitably attached along each longitudinal edge of the foot support 30. The forward end of each tube 31 is inclined upwardly, as at 32, and carries a hook-like element 33 at the end thereof. The hook-like element 33 is adapted to project into an elongated slot 34 in the leg 3 adjacent the lower end of the leg, whereby the front end of the support 30 may be mounted on the frame 1. The rear end of each rod or tube 31 extends upwardly, as shown at 35, thence horizontally, as indicated at 36, and terminates in a vertical projection 37. Each projection 37 will extend through the opening 26' provided in the disk 16 of each rear wheel and will thus fastly support the rear end of the foot support 30. Moreover, by having the rear end of the foot support thus connected to the rear wheels 15, it can be seen that the rear wheels cannot freely swivel and will thus be maintained in the direction of travel of the stroller. Since each wheel 15 is similar in structural detail, it will be noted that the wheels are interchangeable and the advantages thereof are thought readily apparent.

By virtue of our invention, we have provided a highly mobile vehicle for children's use which may be readily converted from stroller to walker uses. By having the foot support and the wheels and the wheel supports constructed in the manner described, the foot support will be securely mounted to the frame when the vehicle is employed as a stroller and the rear wheels will always remain in the line of travel of the vehicle. On the other hand, the vehicle when used for walking purposes by reason of the wheel structure will have free swivelling movement with the attendant advantageous results.

We claim:

1. In a child's vehicle of the character set forth, a frame, wheel suporting elements carried by the front and rear ends of the frame, a swivelling wheel mounted in each of said supporting elements, a resilient bumper surrounding each of said wheels, a foot support, spaced hook-like elements carried by the front end of said support, each of said hook-like elements adapted to extend into an elongated slot formed in said front wheel supporting elements for mounting the forward end of said foot support to the frame, and additional hook-like elements carried by the rear end of said foot support for projecting into an aperture provided in each of said rear wheels for supporting the rear end of said foot support and maintaining said rear wheels in the line of travel of the vehicle.

2. In a child's vehicle of the character set forth, a tubular frame, tubular wheel supporting elements carried by the front and rear ends of the frame, a swivelling wheel mounted in each of said supporting elements, an annular disk on each of said wheels, a resilient bumper supported on the periphery of each disk, a foot support, spaced hook-like elements carried by the front end of said support, each of said hook-like elements being adapted to extend into an elongated slot formed in said tubular front wheel supporting elements whereby the forward end of the foot support is mounted on the frame, and additional spaced hook-like elements carried by the rear end of said foot support for projecting into an aperture formed in the annular disk on each of said rear wheels for supporting the rear end of the foot support and maintaining the rear wheels in the line of travel of the vehicle.

PAUL C. LITTLE.
MARVIN W. SPARROW.

REFERENCES CITED

The following references are of record in the file of this patent:

UNITED STATES PATENTS

| Number | Name | Date |
|---|---|---|
| 1,669,165 | Jarvis et al. | May 8, 1928 |
| 1,850,406 | Mayer | Mar. 22, 1932 |
| 1,888,726 | Jarvis et al. | Nov. 22, 1932 |
| 2,425,253 | Little et al. | Aug. 5, 1947 |
| 2,426,432 | Breckner et al. | Aug. 26, 1947 |